United States Patent [19]

Weyer

[11] Patent Number: 4,667,528

[45] Date of Patent: May 26, 1987

[54] FLANGED ROTARY ACTUATOR

[76] Inventor: Paul P. Weyer, 1462 Blake St., Enumclaw, Wash. 98022

[21] Appl. No.: 662,256

[22] Filed: Oct. 17, 1984

Related U.S. Application Data

[63] Continuation-in-part of Ser. No. 575,228, Jan. 30, 1984, Pat. No. 4,590,816.

[51] Int. Cl.$^4$ .......................... F16H 1/18; F16H 1/20; F01B 3/00
[52] U.S. Cl. .................. 74/424.8 NA; 92/31; 92/33; 74/89.15; 74/424.8 R
[58] Field of Search ............... 74/424.8 NA, 424.8 B, 74/458, 459, 457, 99 A; 92/31, 33

[56] References Cited

U.S. PATENT DOCUMENTS

| | | | |
|---|---|---|---|
| 2,266,923 | 12/1941 | Trbojevich | 74/499 |
| 2,768,532 | 10/1956 | Russell | 74/424.8 |
| 2,806,450 | 9/1957 | Geyer | 121/38 |
| 2,844,969 | 7/1958 | Lohr . | |
| 2,969,689 | 1/1961 | Martens | 74/424.8 |
| 3,062,070 | 11/1962 | Beatty et al. | 74/459 |
| 3,187,592 | 6/1965 | Geyer | 92/33 |
| 3,255,806 | 6/1966 | Meyer et al. | 160/188 |
| 3,329,069 | 7/1967 | Feroy | 92/33 |
| 3,393,610 | 7/1968 | Aarvold | 92/33 |
| 3,508,472 | 4/1970 | Hartwick, Jr. | 92/33 |
| 3,636,780 | 1/1972 | Wallace | 74/89.15 |
| 3,668,714 | 12/1962 | Davis | 74/459 |
| 4,005,641 | 2/1977 | Nussbaumer | 92/33 |
| 4,148,226 | 4/1979 | Benton | 74/459 |
| 4,196,654 | 4/1980 | Stearns | 92/31 |
| 4,199,999 | 4/1980 | Metz | 74/424.8 |
| 4,295,384 | 10/1981 | Brandt et al. | 74/424.8 NA |
| 8,101,440 | 5/1981 | Weyer | 92/33 |

Primary Examiner—Allan D. Herrmann
Assistant Examiner—Martin Belisario
Attorney, Agent, or Firm—Seed and Berry

[57] ABSTRACT

A fluid powered, rotary actuator having a body, an annular member supported for rotation relative to the body, a fluid powered piston reciprocally mounted within the body, corresponding ball races on the body and the piston with balls disposed therein for transmitting torque therebetween, and corresponding ball races on the annular member and the piston with balls disposed therein for transmitting torque therebetween. The body has opposing, generally axially inward projecting support arms, between which the annular member is positioned with ball bearings disposed between the mating annular end walls of the support arms and the annular member. In one embodiment of the invention, the annular member has an attachment rim extending radially outward beyond the body, and adapted for attachment of an external device. The support arms are radially positioned to form a generally cylindrical exterior sidewall for the body, and an interior sidewall is positioned radially inward therefrom, between which the cylindrical piston is concentrically disposed. In another embodiment, the body has a generally cylindrical exterior wall with the support arms positioned radially inward therefrom to define a central recess in the body for receiving an external device. The annular member has a circumferential inner wall splined for driving engagement with the external device. In another disclosed embodiment, the ball grooves are replaced with inner-meshing splines.

57 Claims, 5 Drawing Figures

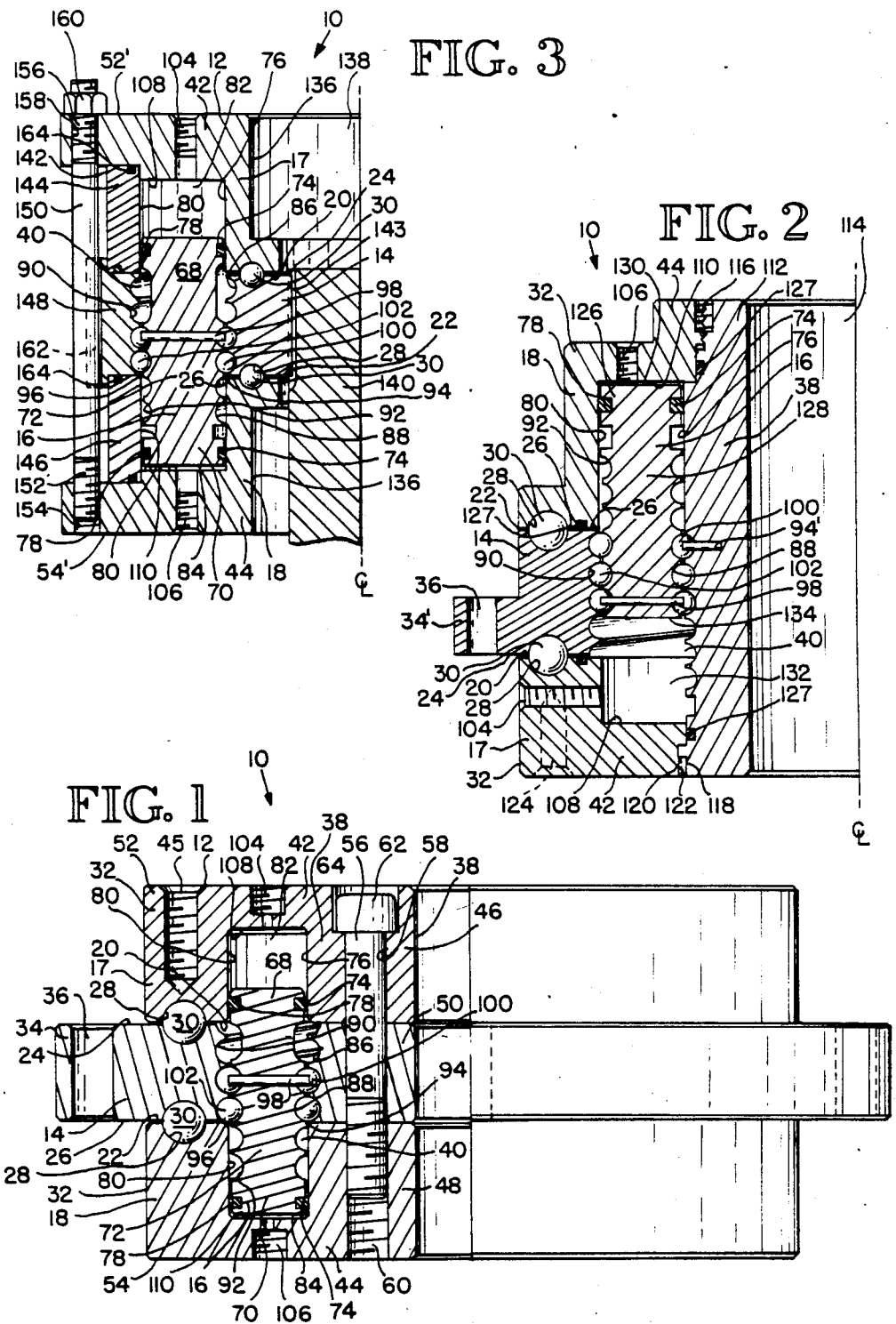

FLANGED ROTARY ACTUATOR

DESCRIPTION

Cross-Reference to Related Application

This is a continuation-in-part of application Ser. No. 575,228, U.S. Pat. No. 4,590,816, filed Jan. 30, 1984.

TECHNICAL FIELD

The present invention relates generally to actuators, and more particularly, to fluid-powered actuators of the type in which axial movement of a piston produces relative movement between a body and an output member.

BACKGROUND ART

Rotary helically splined actuators have been employed in the past to achieve the advantage of high-torque output from a simple linear piston-and-cylinder drive arrangement. The actuators typically employed a cylindrical body with an elongated rotary output shaft extending from end to end coaxially within the body, with an end portion of the shaft providing the drive output. Disposed between the body and the shaft is a piston sleeve splined to cooperate with corresponding splines on the body interior and the output shaft exterior. The piston is reciprocally mounted within the body and has a head for the application of fluid pressure to one or the other opposing sides thereof to produce axial movement of the piston. The sleeve is elongated and coaxially receives the shaft therein.

As the piston linearly reciprocates in an axial direction within the body, the outer splines of the sleeve engage the splines of the body to cause rotation of the sleeve. The resulting linear and rotational movement of the sleeve is transmitted through the inner splines of the sleeve to the splines of the shaft to cause the shaft to rotate. Bearings are typically supplied to rotatably support one or both ends of the shaft relative to the body. With such an arrangement, the overall length of the actuator is frequently dictated by the shaft length. Furthermore, the rotary output of the actuator is transferred by connection of another device or shaft to an end of the output shaft located at one or the other ends of the body. There are situations, however, where it is desirable or mandatory to shorten the overall length of the actuator or to have the rotary output other than at the case ends.

It will therefore be appreciated that there has been a significant need for a rotary actuator with a decreased axial length and with means for connection of the rotary output of the actuator to an external device or shaft other than at the ends of the case. The present invention fulfills this need and further provides other related advantages.

DISCLOSURE OF INVENTION

The present invention resides in a fluid-powered actuator, having a body, an annular member supported for rotation relative to the body, a piston reciprocally mounted within the body for application of fluid pressure to one or the other sides thereof to produce axial movement of the piston, first torque-transmitting means for transmitting torque between the body and the piston, and second torque-transmitting means for transmitting torque between the annular member and the piston. The body is generally cylindrical and the annular member is mounted for substantially coaxial rotation with the body. The body has opposing, generally axially inward projecting support arms, with the annular member positioned therebetween. The actuator further includes means for rotatably supporting the annular member relative to the support arms against axial thrust.

More specifically, in the presently preferred embodiments of the invention, the support arms extend circumferentially, each with a generally axially inward facing end wall. The annular member has opposite, generally axially outward facing, annular end walls, each confronting one of the support arms end walls, with bearing means disposed therebetween for rotatably supporting the annular member relative to the support arms. In one embodiment of the invention, the annular member has an attachment rim extending radially outward beyond the body, and the rim has means for attachment of an external device thereto for rotation therewith.

In another embodiment of the invention, the annular member has a circumferential inner wall, and the actuator further includes means for attachment of the inner wall to an external device for rotation therewith. The body has an exterior sidewall, and the support arms are generally cylindrical and positioned radially inward of the exterior sidewall. The support arms define a central recess in the body for receiving therein the external device, with the inner walls of the annular member being positioned for access throught the recess. The recess is an open-ended, coaxial and cylindrical cavity extending through the full axial length of the body.

In the first-mentioned embodiment, the circumferential support arms are radially positioned to form a generally cylindrical exterior sidewall, and the body has a circumferential interior sidewall positioned radially inward from the exterior sidewall, with the piston being cylindrical and concentrically disposed therebetween. The piston has an annular head for the application of fluid pressure thereto to produce axial movement of the piston, and the piston has an elongated cylindrical sleeve. The first torque-transmitting means includes coacting grooves formed on a radially inward facing wall of the sleeve and on the body interior sidewall, and the second torque-transmitting means includes coacting grooves formed on a radially outward facing wall of the sleeve and on a radially inward facing wall of the annular member. The grooves may be ball races positioned in confronting and corresponding relationship to form channels, with one or more balls seated in each of the inner and outer channels for transmission of torque upon axial movement of the piston by the application of fluid pressure. At least one of the outer or inner channels is helical. Alternatively, the grooves may be intermeshing splines.

In one version of this first embodiment of the invention, the body interior sidewall includes opposing, generally axially inward projecting, circumferential sidewall sections with a circumferential midsection wall fixedly positioned therebetween. The groove of the body interior sidewall is formed on the midsection wall, which may be manufactured of a hardened material. Each of the support arms forming the body exterior sidewall is rigidly attached to one of the sidewall sections forming the body interior sidewall to form two half-assemblies of the body, with the body midsection wall and the annular member positioned therebetween. The half-assemblies are secured together in fixed relative relation by elongated, circumferentially spaced fasteners positioned in bores extending between the half-assemblies through the body midsection wall.

The piston has axially spaced-apart and opposing head portions, with a sleeve portion extending therebetween. The actuator further includes sealing means for maintaining a fluid seal between the head portions and the body interior and exterior sidewalls to define a fluid-tight compartment to an axially outward side of each of the head portions. The sleeve is external to the compartments and not subject to the pressurized fluids therein.

In another variation of the first embodiment of the invention, the body interior sidewall is formed by a substantially circular-in-cross-section shaft having the support arms detachably secured in fixed relation thereto.

In the second mentioned embodiment of the invention, the circumferential support arms are radially positioned to form a generally cylindrical interior sidewall. The body has a circumferential exterior sidewall positioned radially outward from the interior sidewall, with the piston being cylindrical and concentrically disposed therebetween. Similar to the first embodiment, the first torque-transmitting means includes coacting grooves formed on a radially outward facing wall of the sleeve and on the body exterior sidewall, and the second torque-transmitting means includes coacting grooves formed on a radially inward facing wall of the sleeve and on a radially outward facing wall of the annular member. The grooves may be ball races positioned in confronting and corresponding relationship to form outer and inner channels, with one or more balls seated in each of the channels for transmission of torque. At least one of the outer or inner channels is helical. Alternately, the grooves may be intermeshing splines.

The body exterior sidewall includes opposing, generally axially inward projecting, circumferential sidewall sections with a circumferential midsection wall fixedly positioned therebetween. The grooves of the body exterior sidewall are formed on the midsection wall, which may be manufactured of a hardened material. Each of the support arms forming the body interior sidewall is rigidly attached to one of a pair of axially spaced-apart end walls to form two half-assemblies of the body, with the body exterior sidewall sections and midsection wall and with the annular member positioned therebetween. The body half-assemblies are secured together in fixed relative relation by circumferentially spaced tie rods positioned exterior of the body exterior sidewall. The body midsection wall has grooves on a radially outward facing wall for receiving the tie rods therein to prevent rotation of the midsection wall relative to the body half-assemblies.

Again the piston may have two axially spaced-apart and opposed head portions, with a sleeve portion extending therebetween. The actuator may further include sealing means for maintaining a fluid-tight seal between the head portions and the body interior and exterior sidewalls to define a fluid-tight compartment to an axial outward side of each of the head portions. The sleeve is external to the compartments and not subject to pressurized fluids therein.

Other features and advantages of the invention will become apparent from the following detailed description, taken in conjunction with the accompanying drawings.

BRIEF DESCRIPTION OF THE DRAWINGS

FIG. 1 is a side elevational, partial sectional view of a fluid-powered actuator embodying the present invention, using an exteriorly projecting annular member.

FIG. 2 is a side elevational, partial sectional view of a second variation of the first embodiment of the invention with an exteriorly projecting annular member, showing the portion of the actuator to one side of the longitudinal center line.

FIG. 3 is a side elevational, partial sectional view of a second embodiment of the invention, using an inwardly projecting annular member, showing the portion of the actuator to one side of the longitudinal center line.

BEST MODE FOR CARRYING OUT THE INVENTION

Figure 4:
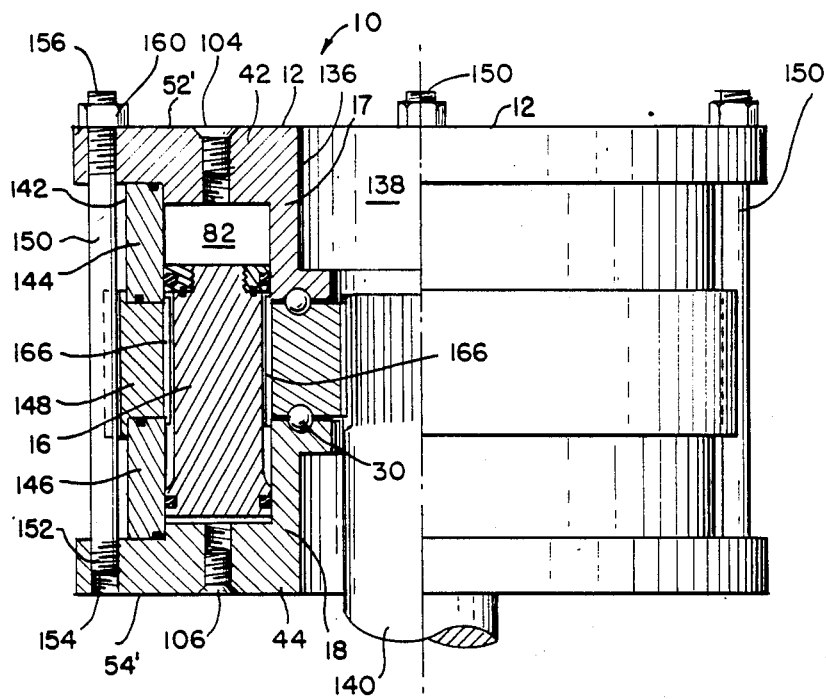
FIG. 4 is a side elevational, partial sectional view of a second variation of the embodiment of FIG. 3, utilizing intermeshing splines rather than ball grooves.

As shown in the drawings for purposes of illustration, the present invention is embodied in a fluid-powered rotary actuator, indicated generally by reference numeral 10. The actuator 10 includes a body 12, an annular member 14 supported for rotation relative to the body, and a piston 16 reciprocally mounted within the body for application of fluid pressure to one or the other opposing sides thereof to produce axial movement of the piston. The actuator 10 provides relative rotational movement between the body 12 and the annular member 14 through the conversion of linear movement of the piston 16 to rotational movement of the annular member, as will be hereinafter described.

The body 12 is generally cylindrical, and the annular member 14 is mounted for substantially coaxial rotation with the body. The body 12 has opposing, generally axially inward projecting support arms 17 and 18, with the annular member 14 positioned therebetween. The support arms 17 and 18 extend circumferentially, each with a generally axially inward facing end wall 20 and 22, respectively. The annular member 14 has opposite, generally axially outward facing, annular end walls 24 and 26. The annular end wall 24 confronts the support arm end wall 20, and the annular end wall 26 confronts the support arm end wall 22. Each of the annular member end walls 24 and 26 and the support arm end walls 20 and 22 has a circular ball race 28 formed therein corresponding to the ball race in the confronting end wall and defining therewith a pair of ball races. One or more ball bearings 30 are disposed in each of the pairs of ball races for rotatably supporting the annular member 14 relative to the support arms 17 and 18 against axial thrust.

Figure 5:
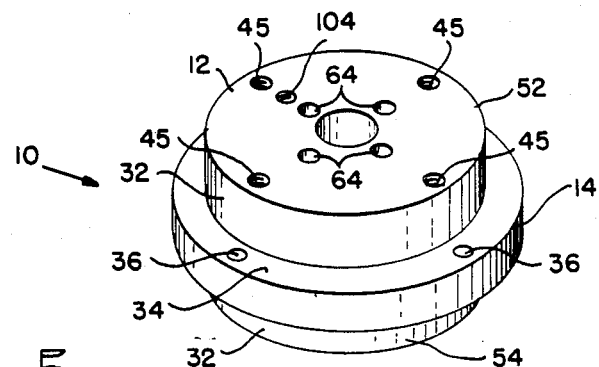
FIG. 5 is a perspective view of the actuator of FIG. 1.

In the embodiment of the invention illustrated in FIGS. 1 and 5, the circumferential support arms 17 and 18 are radially positioned to form a generally cylindrical exterior sidewall 32 of the body 12. The anular member 14 has an attachment rim 34 extending radially outward beyond the cylindrical exterior sidewall 32 formed by the support arms 17 and 18. The rim 34 has a plurality of bore holes 36 therethrough for attachment of an external device (not shown). It is to be understood that the invention may be practiced with the annular member 14 rotatably driving the external device, or with the annular member being held stationary and the rotational drive being provided by the rotation of the body 12.

The body 12 has a circumferential interior sidewall 38 positioned radially inward from the exterior sidewall 32 to define an annular piston chamber 40 therebetween. The piston 16 is cylindrical and concentrically disposed between the exterior sidewall 32 and the interior sidewall 38 in the piston chamber 40. The body 12 also includes a pair of axially spaced-apart end walls 42 and 44, with the support arm 17 rigidly attached to the body end wall 42 and the support arm 18 rigidly attached to the body end wal 44. The circumferential support arms 17 and 18 each project generally axially inward from the body end walls 42 and 44 to define a circumferential space therebetween in which the annular member 14 is positioned and supported for rotation relative to the body. Threaded recesses 45 are provided in the body end wall 42 for attachment of the actuator 10 to an external device or support frame (not shown).

The body interior sidewall 38 includes opposing, generally axially inward projecting, circumferential sidewall sections 46 and 48, each rigidly attached to the body end walls 46 and 48 have a circumferential midsection wall 50 fixedly positioned therebetween. With such construction, the body 12 may be manufactured of two half-assemblies 52 and 54, the first formed by the support arm 17, the end wall 42, and the interior sidewall section 46, and the other formed by the support arm 18, the end wall 44, and the interior sidewall section 48. The body half-assemblies 52 and 54 may each be constructed as an integral unit, and may be secured together in fixed relative relation by elongated, circumferentially spaced fasteners 56 positioned in bores 58 extending between the half-assemblies through the body midsection wall 50. In the embodiment of FIG. 1, the fastener 56 is shown as a bolt threadedly received in a threaded bore hole 60 of the half-assembly 54, with a head portion 62 positioned in a countersunk recess 64 in the half-assembly 52. While in this embodiment of the invention the body 12 has a hollow axial passageway, the body may be formed with a solid center, with the midsection wall 50 being formed as a disc rather than being annular, as is shown in FIG. 1.

The piston 16 has two axially spaced-apart and opposing annular head portions 68 and 70, with an elongated cylindrical sleeve portion 72 extending therebetween. Each of the piston head portions 68 and 70 carries an inner seal 74 disposed between the head portion and a smooth interior bore portion 76 of the body interior sidewall 38, and an outer seal 78 disposed between the head portion and a smooth bore portion 80 of the exterior sidewall 32 to define a fluid-tight compartments 82 and 84 to an axial outward side of each of the head portions 68 and 70, respectively. The smooth interior sidewall bore portions 76 and 80 have a sufficient axial length to accommodate the full stroke of the piston 16 within the piston chamber 40. Using such a double-acting piston, the sleeve portion 72 is maintained external of the fluid compartments 82 and 84 and not subject to the pressurized fluids therein. In such manner, ordinary lubricants, such as grease, may be applied to the sleeve area through a conventional grease fitting (not shown). Since the sleeve area communicates with the balls 30 in the ball races 28, the same grease may be used to lubricate these races. An exclusion seal (not shown) may be utilized to keep moisture and foreign matter from entering the space between the annular member 14 and the support arms 17 and 18.

In the embodiment of the invention of FIGS. 1 and 5, the midsection wall 50 of the body interior sidewall 38 is manufactured of a hardened material and has a first helical ball race 86 integrally formed on a radially outward facing surface. A radially inward facing wall of the sleeve portion 72 has a second helical ball race 88 confronting and corresponding to the first ball race 86 of the midsection wall 50. The first and second ball races 86 and 88 have substantially identical lead and pitch, and form a laterally confined, variable length inner channel, defined by the area of coincidence of the two ball races as the piston 16 moves axially within the piston chamber 40.

A radially inward facing wall of the annular member 14 has a third helical ball race 90 formed integrally thereon, and a radially outward facing wall of the sleeve portion 72 has a fourth helical ball race 92 confronting and corresponding to the third ball race. The third and fourth ball races 90 and 92 have substantially identical lead and pitch, and form a laterally confined, variable length outer channel, defined by the area of coincidence of the two ball races as the piston 16 moves axially within the piston chamber 40. The midsection wall 50, the sleeve portion 72, and the annular member 14 are diametrically sized to provide minimal interspacing to increase ball contact with the inner and outer channels and promote torque transmission by the balls carried therein and to increase the axial load-carrying ability of the actuator 10. The invention may be practiced with the ball races of only one of the inner or outer channels being helical, with the ball races of the other channel being longitudinally straight and contributing no rotation.

A first stop 94 is formed by a beveled interior edge wall portion of the body interior sidewall section 48 abutting and adjacent to an end of the first ball race 86 for engaging and limiting the travel of balls through the inner channel formed by the first and second ball races 86 and 88 toward the body end wall 44. A second stop 96 is formed by a beveled interior edge wall of the support arm 18 abutting and adjacent to an end of the third ball race 92 for engaging and limiting travel of the balls through the outer channel formed by the third and fourth ball races 90 and 92 toward the body end wall 44. A stop pin 98 extends laterally through the sleeve portion 72 of the piston 16 and has its two free ends projecting into both the second ball race 88 and the fourth ball race 92 of the sleeve portion. The pin 98 is stationary with respect to the sleeve portion and travels therewith for engaging and collecting balls in the inner and outer channels to regroup the balls toward the first and second stops 94 and 96, respectively, as the piston 16 travels in the direction toward the body end wall 44. It is noted that the pin 98 will only operate to regroup the balls in the inner and outer channels should they not roll back fully against the stops 94 and 96 when the piston 16 completes its travel toward the body end wall 44.

One or more balls 100 are seated in the inner channel, between the first stop 94 and the pin 98, and in rolling engagement therewith. One or more balls 102 are seated in the outer channel, between the second stop 96 and the pin 98, and in rolling engagement therewith. The balls 100 in the inner channel transmit torque between the body 12 and the piston 16, and the balls 102 in the outer channel transmit torque between the piston and the annular member 14 upon axial movement of the piston by the application of fluid pressure to the actuator 10.

Reciprocation of the piston 16 within the body piston chamber 40 of the body 12 occurs when hydraulic fluid or air under pressure enters through a first port 104 in the body end wall 42, which communicates with the chamber 82, or through a second port 106 in the body end wall 44, which communicates with the chamber 84. As the piston 16, and the sleeve portion 72 forming a part thereof, linearly reciprocate in an axial direction within the body 12, torque is transmitted by the balls 100 through the coaction of the first ball race 86 of the interior midsection wall 50 and the second ball race 88 of the sleeve portion 72 to cause rotation of the sleeve portion. The resulting linear and rotational movement of the sleeve portion 72 is transmitted by the balls 102 through the coaction of the third ball race 90 of the annular member 14 and the fourth ball race 92 of the sleeve portion 72 to apply torque to the annular member and cause its rotation relative to the body 12. Since the axial movement of the annular member 14 is restricted by the support arms 17 and 18, axial movement of the piston 16 is converted into relative rotational movement between the body 12 and the annular member.

The axial movement of the piston 16 within the piston chamber 40 of the body 12 toward the body end wall 42 is limited by the piston head portion 68 engaging an inward face 108 of the body end wall, and axial movement of the piston toward the other body end wall 44 is limited by the piston head portion 70 engaging an inward face 110 of the body end wall. With the piston 16 positioned at its end limit of travel toward the body end wall 44, as substantially shown in FIG. 1, the inner and outer channels preferably have a sufficient quantity of balls 100 and 102 therein to substantially fill the channels between the stops 94 and 96 and the pin 98. It is noted that the actuator 10 may use single-start or double-start ball races.

Again, as measured with the piston 16 positioned at its end limit of travel toward the body end wall 44, the second ball race 88 and the fourth ball race 92 extend over an axial length of the sleeve portion 72 projecting beyond the first and second stops 94 and 96, respectively, toward the body end wall 44, at least one-half of the distance of the end-to-end axial travel of the piston 16 within the piston chamber 40. The balls 100 and 102 disposed in the inner and outer channels travel along the channels as they roll approximately one-half the distance the sleeve portion 72 travels with respect to the body 12 and the annular member 14, as the piston 16 is moved from one end limit of travel adjacent to the body end wall 44 to the other end limit of travel adjacent to the other body end wall 42. To accommodate the slower travel of the balls 100 and 102, the second and fourth ball races 88 and 92 must extend over a sufficient length of the sleeve portion 72 beyond the first and second stops 94 and 96 to allow free rolling of the balls within the inner and outer channels during the entire piston travel and thereby avoid scuffing of the balls.

For similar reasons to those discussed above, the first ball race 86 of the interior midsection wall 50 and the third ball race 90 of the annular member 14 extend over an axial length of the midsection wall and annular member beyond the pin 98 toward the body end wall 42 at least one-half of the distance of the end-to-end axial travel of the piston 16 within the body, as measured with the piston positioned at its end limit of travel toward the body end wall 44. In effect, the inner and outer channels axially expand and contract as the piston 16 moves between its end limits of travel. It is noted that, if desired, the first and third ball races 86 and 90, may extend further beyond the pin 98 and that if the pin 98 projects sufficiently to enter the first and third ball races, the ball races must extend over an axial length of the interior midsection wall 50 and the annular member 14 beyond the pin toward the body end wall 42 by at least the distance of the end-to-end axial travel of the piston 16, or other recess means must be provided to avoid the pin impeding the piston travel toward the body end wall 42.

A second variation of the first embodiment of the invention just described is shown in FIG. 2, with the body interior sidewall 38 being formed by a substantially circular-in-cross-section shaft 112 having a hollow interior 114. The shaft 112 is threadably attached to the body end wall 44 and fixed relative thereto by a set screw 116. An end portion 118 of the shaft 112 and a corresponding portion 120 of the body end wall 42 have intermeshing splines 122 to maintain the shaft and the body end wall 42 in fixed relative relation and to transmit torque therebetween. Threaded recesses 124 are provided in the body end wall 42 for attachment of the actuator 10 to an external device or support frame (not shown). It is noted that, for ease of explanation, the orientation of the body end walls 42 and 44 have been shown reversed from those of FIG. 1.

In the actuator 10 of FIG. 2, the piston 16 has a single head portion 126 at the end of the piston toward the body end wall 44, and a sleeve portion 128 extending therefrom toward the body end wall 42. The seals 74 and 78 define a fluid-tight compartment 130 to an axially outward side of the head portion 126 toward the body end wall 44, and a second fluid-tight compartment 132 to an axially inward side of the head portion 126, with the sleeve portion 128 being within the compartment 132 and subject to the pressurized fluids therein. The port 106 communicates with the compartment 130, and the port 104 communicates with the compartment 132. In this embodiment, the port 104 extends through the circumferential support arm 17. Conventional seals 127 are provided between the shaft 112 and the body end walls 42 and 44, and between the inward facing end walls 20 and 22 of the support arms 17 and 18, and the outward facing end walls 24 and 26 of the annular member 14. The annular member 14 is provided with a reduced thickness rim 34'.

In the embodiment of FIG. 2, the first stop is a pin 94' attached to the shaft 112 and axially stationary with respect to the body 12. The first stop pin 94' projects into the first ball race 86 formed on an outwardly facing surface of the shaft 112. The first ball race 86 extends along a portion of the shaft 112 toward the body end wall 42 and has a sufficient length to accommodate the full stroke of the piston 16. The axial movement of the piston 16 within the piston chamber 40 of the body 12 toward the body end wall 42 in the embodiment of FIG. 2 is limited by an end wall 134 of the sleeve portion 128 engaging the inward face 108 of the body end wall 42. While the pin 98 projects beyond the sleeve portion 128 sufficiently to have its two free ends projecting into both the second and fourth ball races 88 and 92, the pin does not project into the first and third ball races 86 and 90 to prevent its interference with the travel of the piston 16 as the pin 98 is carried by the sleeve portion beyond the end of the third ball race 90 of the annular member 14 and beyond the end of the first ball race 86 of the interior sidewall 38 as it moves toward its end limit of travel at the body end wall 42.

In an alternative embodiment of the invention, shown in FIG. 3, the circumferential support arms 17 and 18 are radially positioned to form a generally cylindrical interior sidewall 136, with an open-ended, coaxial, and cylindrical cavity 138 extending through the full axial length of the body 12 and forming a central recess in which a splined shaft 140 of an external device may be inserted. A circumferential exterior sidewall 142 is positioned radially outward from the interior sidewall 136, with the cylindrical piston 16 concentrically disposed therebetween. In the illustrated embodiment, a two-headed piston 16 is provided of the type previously described for the actuator 10 of FIGS. 1 and 5.

As before described, the annular member 14 is positioned between the axially inward facing end walls 20 and 22 of the support arms 17 and 18, and the axially outward facing annular end walls 24 and 26 of the annular member 14 of each confront one of the support arm end walls, with the bearings 30 disposed therebetween in circular grooves 28 for rotatably supporting the annular member relative to the support arms against axial thrust. In this embodiment, the annular member 14 is positioned radially inward from the exterior body wall 142 and has a radially outward facing wall on which the first ball race 86 is formed. The outward facing wall of the annular member 14 is radially positioned substantially flush with the smooth interior bore portion 76 of the interior body sidewall 136. A radially inward facing inner wall of the annular member 14 is positioned radially inward of the inner wall of the interior body sidewall 136 defining the central cavity 138 and has splines 143 formed thereon for intermeshing with corresponding splines on the shaft 140 of the external device. In this embodiment of the invention, the rotary output drive of the actuator 10 is delivered by the annular member 14 interiorly of the actuator body 12.

The exterior body sidewall 142 is formed by opposing, generally axially inward projecting, circumferential sidewall sections 144 and 146, with a circumferential midsection wall 148 fixedly positioned therebetween. The third ball race 90 is formed on a radially inward facing wall of the midsection wall 148, which is manufactured of a hardened material. The support arm 17 is rigidly attached to the body end wall 42 and the support arm 18 is rigidly attached to the body end wall 44 to form two half-assemblies 52' and 54' of the body 12. The exterior body sidewall 142 formed by the exterior sidewall sections 144 and 146 and the body midsection wall 148, and the annular member 14 are positioned between the half-assemblies 52' and 54'.

The body half-assemblies 52' and 54' are secured together in fixed relative relation by a plurality of circumferentially spaced tie rods 150 positioned exterior of the exterior body sidewall 142. A threaded end portion 152 of the tie rod 150 is threadably received in a threaded recess 154 in a portion of the half-assembly 54' extending radially outward beyond the exterior body sidewall 142. An opposite end 156 of the tie rod 150 extends through a bore hole 158 in a portion of the body half-assembly 52' extending radially outward of the exterior sidewall body 142 and has a nut 160 threadably attached thereto. The body midsection wall 148 has longitudinally extending grooves 162 formed on a radially outward facing wall thereof for receiving the tie rods 150 therein to prevent rotation of the midsection wall relative to the body half-assemblies 52' and 54'.

Conventional seals 164 are provided between the exterior body sidewall sections 142 and 146 and the body half-assemblies 52' and 54', and between the exterior sidewall sections and the midsection wall 148 to provide a fluid-tight seal therebetween. The body half-assemblies 52' and 54' are each constructed as an integral unit formed by one of the body end walls 42 and 44 and one of the support arms 17 and 18.

A second variation of the alternative of FIG. 3 is shown in FIG. 4 with the ball races 86, 88, 90 and 92 replaced by intermeshing splines 166. In all other respects, the embodiment is identical with that of FIG. 3.

It will be appreciated that, although specific embodiments of the invention have been described herein for purposes of illustration, various modifications may be made without departing from the spirit and scope of the invention. Accordingly, the invention is not limited except by the appended claims.

I claim:

1. A fluid-powered actuator, comprising a body having an annular interior body cavity with an a pair of axially spaced opposed annular chamber portions each said annular chamber portion having a pair of radially spaced circumferential smooth walls stationary with respect to each other, a annular member supported ed for rotation relative to said body and having generally radially extending sidewalls, said annular member being positioned between said pair of said chamber portions a double acting annular piston coaxially mounted within said body for axial reciprocation and having a pair of axially spaced piston head portions each positioned within one of said chamber portions between said opposing smooth chamber walls with seal means for providing a fluid-tight seal between each said piston head portion and said smooth chamber walls of one of said chamber portions for application of fluid pressure to one or the other opposing sides of said piston head portion to produce axial movement of said piston, each said smooth walled chamber portion having a sufficient axial length to accommodate the full end-to-end axial stroke of each said piston head, portion first torque-transmitting means for transmitting torque between said body and said piston, and second torque-transmitting means for transmitting torque between said annular member and said piston.

2. The actuator of claim 1 wherein said body is generally cylindrical and said annular member is mounted for substantially coaxial rotation with said body.

3. The actuator of claim 2 wherein said body has a pair of opposing, generally axially inward projecting support walls, each with an annular axially inward facing end wall, said support wall end walls defining a circumferential space therebetween located at the axial center portion of said body, said annular member radially projecting through said support wall space to the exterior of said body for attachment to an external device, said annular member radial sidewalls being positioned between and in juxtaposition with said support wall end walls, the actuator further including bearing means located between confronting ones of said support wall end walls and said annular member radial sidewalls for rotatably supporting said annular member relative to said support walls against axial thrust.

4. The acutuator of claim 3 wherein said bearing means including bearings positioned between said annular member radial sidewalls and said support wall end walls.

5. The actuator of claim 3 wherein said annular member has a circumferential inner wall, and the actuator further includes means for attachment of said inner wall to the external device for rotation therewith.

6. The actuator of claim 5 wherein said body has an exterior sidewall and said support walls are generally cylindrical and positioned radially inward of said exterior sidewall, said support walls defining a central recess in said body for receiving therein the external device, said annular member projecting inward through said support wall space to position said annular member inner wall at said central recess for access by the external device extending into said recess.

7. The actuator of claim 6 wherein said recess is an open-ended, coaxial and cylindrical cavity extending through the full axial length of said body.

8. The actuator of claim 3 wherein said annular member has an attachment rim extending radially outward beyond said body, and said rim has means for attachment of an external device thereto for rotation therewith.

9. A fluid-powered actuator, comprising a generally cylindrical body having a pair of opposing, generally axially inward projecting and circumferentially extending support walls and a circumferentially extending body wall confronting and spaced apart from said support walls, said support walls and said body wall defining an annular interior body cavity with a pair of spaced apart, axially extending annular chamber portions, each said chamber portion having opposing circumferential smooth interior wall surfaces stationary with respect to each other, each of said support walls having a generally axially inward facing end wall positioned at the axial center portion of said body and spaced apart from the other of said end walls to define a circumferential space therebetween, a annular member projecting through said support wall space to the exterior of said body for attachment to an external device, said annular member being positioned between said support walls and supported thereby for substantially coaxial rotation relative to said body, said annular member having opposite facing, generally radially extending sidewalls, each of said sidewalls confronting one of said support wall end walls, and having bearing means disposed therebetween for rotatably supporting said annular member relative to said support walls, a double acting annular piston having a pair of annular pistons heads coaxially mounted within said body cavity for axial reciprocation and having each said annular piston head positioned within one of said smooth walled chamber portion, said smooth walled chamber portions, each having sufficient axial length to accommodate the full end-to-end axial stroke of said piston head, each said piston head carrying inner and outer seals for providing a fluid-tight seal between said piston head and each of said opposing smooth wall surfaces for application of fluid pressure to one or the other opposing sides of said annular piston to produce axial movement of said piston, first torque-transmitting means for transmitting torque between said body and said piston, and second torque-transmitting means for transmitting torque between said annular member and said piston.

10. The actuator of claim 9 wherein each of said annular member sidewalls and support wall end walls has a circular ball race formed therein corresponding to said ball race in the confronting wall and defining therewith a ball channel, said bearing means including one or more balls disposed in each of said ball channels.

11. The actuator of claim 9 wherein said circumferential support walls are radially positioned to form a generally cylindrical exterior sidewall.

12. The actuator of claim 11 wherein said annular member has an attachment rim extending radially outward beyond said cylindrical exterior sidewall formed by said support walls.

13. The actuator of claim 11 wherein said body has a circumferential interior sidewall positioned radially inward from said exterior sidewall, with said annular piston being cylindrical and concentrically disposed therebetween.

14. The actuator of claim 13 wherein said piston has an elongated cylindrical sleeve.

15. The actuator of claim 14 wherein said first torque-transmitting means includes coacting grooves formed on a radially inward facing wall of said sleeve and on said body interior sidewall, and said second torque-transmitting means includes coacting grooves formed on a radially outward facing wall of said sleeve and on a radially inward facing wall of said annular member.

16. The actuator of claim 15 wherein said grooves on said sleeve inward wall and said body interior sidewall are helical ball races positioned in confronting and corresponding relationship to form an inner channel, and said first torque-transmitting means forther includes one or more balls seated on said inner channel for transmitting torque between said body and said sleeve and producing relative rotation therebetween upon axial movement of said piston by the application of fluid pressure to at least one of said heads.

17. The actuator of claim 15 wherein said grooves on said sleeves outward wall and said annular member are helical ball races positioned in confronting and corresponding relationship to form an outer channel, and said second torque-transmitting means further includes one or more balls seated in said outer channel for transmitting torque between said sleeve and said annular member and producing relative rotation therebetween upon axial movement of said piston by the application of fluid pressure to at least one of said heads.

18. The actuator of claim 15 wherein said grooves on said sleeve inward wall and said body interior sidewall, and said grooves on said sleeve outward wall and said annular member are intermeshing splines, at least one of said pairs of intermeshing splines being helical.

19. The actuator of claim 15 wherein said body interior sidewall includes opposing, generally axially inward projecting circumferential sidewall sections with a circumferential midsection wall fixedly positioned therebetween.

20. The actuator of claim 19 wherein said groove of said body interior sidewall is formed on said midsection wall.

21. The actuator of claim 19 wherein each of said support walls forming said body exterior sidewall is rigidly attached to one of said sidewall sections forming said body interior sidewall to form two half-assemblies of said body, with said body midsection wall and said annular member positioned therebetween.

22. The actuator of claim 21 wherein said body half-assemblies are secured together in fixed relative relation by elongated, circumferentially spaced fasteners positioned in bores extending between said half-assemblies through said body midsection wall.

23. The actuator of claim 15 wherein said body interior sidewall is formed by a substantially circular in cross-section shaft having said support walls detachably secured in fixed relation thereto.

24. The actuator of claim 13 wherein said piston has two axially spaced-apart and opposing head portions, each positioned in one of said pair of annular chamber portions with a sleeve portion extending therebetween, and wherein said first torque-transmitting means includes coacting grooves formed on a radially inward facing wall of said sleeve and on said body interior sidewall, and said second torque-transmitting means includes coacting grooves formed on a radially outward facing wall of said sleeve and on a radially inward facing wall of said annular member, each of said chamber portions having opposing circumferential smooth interior wall surfaces stationary with respect to each other, and said smooth walled chamber portions having sufficient axial length to accommodate the full end-to-end axial stroke of said piston head portion positioned therein, and further including sealing means for maintaining a fluid seal between each of said piston head portions and said corresponding chamber smooth wall surfaces to define a fluid-tight compartment to an axially outward side of each of said head portions, said sleeve and support wall space being external of said comparments and not subject to pressurized fluids therein.

25. The actuator of claim 9 wherein said circumferential support walls are radially positioned to form a generally cylindrical interior sidewall with said support wall space forming an inward opening in said interior sidewall.

26. The actuator of claim 25 wherein said body has a circumferential exterior sidewall positioned radially outward from said interior sidewall, with said annular piston being cylindrical and concentrically disposed therebetween.

27. The actuator of claim 26 wherein said piston has an elongated cylindrical sleeve.

28. The actuator of claim 27 wherein said first torque-transmitting means includes coacting grooves formed on a radially outward facing wall of said sleeve and on said body exterior sidewall, and said second torque-transmitting means includes coacting grooves formed on a radially inward facing wall of said sleeve and on a radially outward facing wall of said annular member.

29. The actuator of claim 28 wherein said grooves on said sleeve outward wall and said body exterior sidewall are helical ball races positioned in confronting and corresponding relationship to form an outer channel, and said first torque-transmitting means further includes one or more balls seated in said outer channel for transmitting torque between said body and said sleeve and producing relative rotation therebetween upon axial movement of said piston by the application of fluid pressure to at least one of said heads.

30. The actuator of claim 28 wherein said grooves on said sleeves inward wall and said annular member are helical ball races positioned in confronting and corresponding relationship to form an inner channel, and said second torque-transmitting means further includes one or more balls seated in said inner channel for transmitting torque between said sleeve and said annular member and producing relative rotation therebetween upon axial movement of said piston by the application of fluid pressure to at least one of said heads.

31. The actuator of claim 28 wherein said grooves on said sleeve outward wall and said body exterior sidewall, and said grooves on said sleeve inward wall and said annular member are intermeshing splines, at least one of said pairs of intermeshing splines being helical.

32. The actuator of claim 28 wherein said body exterior sidewall includes opposing, generally axially inward projecting circumferential sidewall sections with a circumferential midsection wall fixedly positioned therebetween.

33. The actuator of claim 32 wherein said groove of said body exterior sidewall is formed is on said midsection wall.

34. The actuator of claim 32 wherein each of said support walls forming said body interior sidewall is rigidly attached to one of a pair of axially spaced-apart body end walls to form two half-assemblies of said body, with said body exterior sidewall sections and midsection wall and said annular member positioned therebetween.

35. The actuator of claim 34 wherein said body half-assemblies are secured together in fixed relative relation by circumferentially spaced tie rods positioned exterior of said body exterior sidewall.

36. The actuator of claim 35 wherein said body midsection wall has grooves on a radially outward facing wall for receiving said tie rods therein to prevent rotation of said midsection wall relative to said body half-assemblies.

37. The actuator of claim 26 wherein said piston has two axially spaced apart and opposed head portions with a sleeve portion extending therebetween, and wherein said first torque-transmitting means includes coacting grooves formed on a radially outward facing wall of said sleeve and on said body exterior sidewall, and said second torque-transmitting means includes grooves formed on a radially inward facing wall of said sleeve and on a radially outward facing wall of said annular member, each head portion being positioned in one of said pair of annular chamber portions having opposing circumferential smooth interior wall surfaces stationary with respect to each other, and said smooth walled chamber portions having sufficient axial length to accommodate the full end-to-end axial stroke of said piston head portion positioned therein, and further including sealing means for maintaining a fluid seal between each of said piston head portions and said corresponding chamber smooth wall surfaces to define a fluid-tight compartment to an axial outward side of each of said piston heads, said sleeve and support wall space being external to said compartments and not subject to pressurized fluids therein.

38. A fluid-powered actuator for attachment to an external device, comprising a generally cylindrical body having a pair of axially spaced-apart end walls and a continuous circumferential exterior sidewall extending between said end walls, said body further having an interior sidewall positioned radially inward from said exterior sidewall to define a double-acting annular piston chamber therebetween, a cylindrical annular piston having a pair of annular piston heads reciprocally mounted within said chamber for application of fluid pressure to the opposing sides of each annular piston head to produce axial movement of said piston in said chamber, said interior sidewall being formed by a pair of circumferential interior sidewall portions each projecting generally axially inward from one of said end walls and confronting a corresponding portion of said exterior sidewall, said interior sidewall portions defining an annular circumferential space therebetween each of said interior sidewall portions and the corresponding and confronting portion of said exterior sidewall defining a piston chamber portion with opposing circumferential smooth interior wall surfaces stationary with respect to each other, each said piston head being disposed in one of said smooth walled piston chamber portions and each said piston chamber portion having sufficient axial length to accommodate the full end-to-end axial stroke of the piston head located therein, each said piston head carrying inner and outer seals for providing a fluid-tight seal between said piston head and each of said interior smooth wall surfaces forming said smooth walled piston chamber portion, an annular member positioned in and projecting radially inward through said circumferential space into an axial recess having at least one open end for external access and positioned radially inward from said interior sidewall for receiving therein the external device, said annular member having a circumferential inner wall with means for attachment of the external device thereto for rotation therewith accessible through said axial recess, said annular member having opposite facing, generally radially extending sidewalls each confronting one of said interior sidewall portion end walls and having bearing means disposed between said confronting one of said annular member sidewalls and said interior sidewall portion end walls for rotatably supporting said annular member relative to said interior sidewall portions against axial thrust, first torque-transmitting means for transmitting torque between said body exterior sidewall and said piston, and second torque-transmitting means for transmitting torque between said annular member and said piston.

39. The actuator of claim 38 wherein said axial recess is an open-ended, coaxial and cylindrical cavity extending through the full axial length of said body.

40. The actuator of claim 38 wherein said means for attachment of the external device includes splines formed on said inner wall of said annular member.

41. The actuator of claim 38 wherein each of said confronting annular member sidewalls and interior sidewall portion end walls has a circular ball race formed therein and define a pair of ball channels, said bearing means including one or more balls disposed in each of said pairs of ball channels.

42. The actuator of claim 38 wherein said piston has an elongated cylindrical sleeve attached to said head for movement therewith.

43. The actuator of claim 42 wherein said first torque-transmitting means includes a first ball race formed on a radially outward facing wall of said sleeve and a second ball race formed on said body exterior sidewall corresponding to and confronting said first ball race to form a first channel, and further includes one or more balls seated in said first channel for transmitting torque between said body exterior sidewall and said piston upon axial movement of said piston by the application of fluid pressure to at least one of said heads, and said second torque-transmitting means includes a third ball race formed on a radially inward facing wall of said sleeve and a fourth ball race formed on a radially outward facing wall of said annular member corresponding to and confronting said third ball race to form a second channel, and further includes one or more balls seated in said second channel for transmitting torque between said annular member and said piston upon axial movement of said piston by the application of fluid pressure to at least one of said heads, at least one of said first or second channels being helical.

44. The actuator of claim 43 wherein said body exterior sidewall includes a pair of exterior sidewall portions each projecting generally axially inward from one of said body end walls and a circumferential midsection wall fixedly positioned therebetween and retained against rotation relative to said exterior sidewall portions, said second ball race being formed on said midsection wall.

45. The actuator of claim 42 wherein said first torque-transmitting means includes intermeshing splines formed on a radially outward facing wall of said sleeve and on said body exterior sidewall, and said second torque-transmitting means includes intermeshing splines formed on a radially inward facing wall of said sleeve and on a radially outward facing wall of said annular member, at least one of said pairs of intermeshing splines being helical.

46. The actuator of claim 45 wherein said body exterior sidewall includes a pair of exterior sidewall portions each projecting generally axially inward from one of said body end walls and a circumferential midsection wall positioned therebetween and retained against rotation relative to said exterior sidewall portions, said splines of said body exterior sidewall being formed on said midsection wall.

47. A fluid-powered actuator, comprising a generally cylindrical body having a pair of axially spaced-apart end walls and an exterior sidewall, said exterior sidewall being formed by a pair of circumferential exterior sidewall portions each projecting generally axially inward from one of said end walls to define an annular circumferential space therebetween, an annular member positioned in said circumferential space and supported for substantially coaxial rotation relative to said body, said body further having a circumferential interior sidewall extending between said end walls and postioned radially inward from said exterior sidewall to define an annular piston chamber therebetween, each of said exterior sidewall portions and a corresponding and confronting portion of said interior sidewall defining a piston chamber portion with opposing circumferential smooth interior wall surfaces stationary with respect to each other, a double acting annular piston having a pair of annular piston heads reciprocally mounted within said chamber for application of fluid pressure to the opposing sides of each annular piston head to produce axial movement of said piston in said chamber, each said piston head being disposed in one of said smooth walled piston chamber portions and each said piston chamber portion having sufficient axial length to accommodate the full end-to-end axial stroke of the piston head located therein, each said piston head carrying inner and outer seals for providing a fluid-tight seal between said piston head and each of said interior smooth wall surfaces forming said smooth walled piston chamber portion, first torque-transmitting means for transmitting torque between said body interior sidewall and said piston, and second torque-transmitting means for transmitting torque between said annular member and said piston.

48. The actuator of claim 47, further including bearing means disposed between said annular member and said exterior sidewall portions for rotatably supporting said annular member relative to said body against axial thrust.

49. The actuator of claim 48 wherein said annular member has an attachment rim extending radially outward beyond said exterior sidewall portions.

50. The actuator of claim 47 wherein said exterior sidewall portions each have a generally axially inward facing end wall, and said annular member has opposite, generally axially outward facing, annular end walls, each confronting one of said sidewall portion end walls, with bearing means disposed therebetween for rotatably supporting said annular member relative to said sidewall portions.

51. The actuator of claim 50 wherein each of said annular member end walls and sidewall portion end walls has a circular ball race formed therein corresponding to said ball race in the confronting end wall and defining therewith a pair of ball races, said bearing means including one or more balls disposed in each of said pair of ball races.

52. The actuator of claim 47 wherein said piston has an elongated cylindrical sleeve attached to said head for movement therewith.

53. The actuator of claim 52 wherein said first torque-transmitting means includes a first ball race formed on a radially inward facing wall of said sleeve and a second ball race formed on said body interior sidewall corresponding to and confronting said first ball race to form a first channel, and further includes one or more balls seated in said first channel for transmitting torque between said body interior sidewall and said piston upon axial movement of said piston by the application of fluid pressure to at least one of said heads, and said second torque-transmitting means includes a third ball race formed on a radially outward facing wall of said sleeve and a fourth ball race formed on a radially inward facing wall of said annular member corresponding to and confronting said third ball race to form a second channel, and further includes one or more balls seated in said second channel for transmitting torque between said annular member and said piston upon axial movement of said piston by the application of fluid pressure to at least one of said heads, at least one of said first or second channels being helical.

54. The actuator of claim 53 wherein said body interior sidewall includes a pair of interior sidewall portions each projecting generally axially inward from one of said body end walls and a circumferential midsection wall fixedly positioned therebetween and retained against rotation relative to said interior sidewall portions, said second ball race being formed on said midsection wall.

55. The actuator of claim 52 wherein said first torque-transmitting means includes intermeshing splines formed on a radially inward facing wall of said sleeve and on said body interior sidewall, and said second torque-transmitting means includes intermeshing splines formed on a radially outward facing wall of said sleeve and on a radially inward facing wall of said annular member, at least one of said pairs of intermeshing splines being helical.

56. The actuator of claim 55 wherein said body interior sidewall includes a pair of interior sidewall portions each projecting generally axially inward from one of said body end walls and a circumferential midsection wall positioned therebetween and retained against rotation relative to said interior sidewall portions, said splines of said body interior sidewall being formed on said midsection wall.

57. The actuator of claim 47 wherein said body interior sidewall is formed by a substantially circular in cross-section shaft extending between said body end walls and retained against rotation relative thereto.

* * * * *

UNITED STATES PATENT AND TRADEMARK OFFICE
CERTIFICATE OF CORRECTION

PATENT NO. :   4,667,528

DATED      :   May 26, 1987

INVENTOR(S):   Paul P. Weyer

It is certified that error appears in the above-identified patent and that said Letters Patent is hereby corrected as shown below:

In the Claims:

Claim 1, line 23, delete "a" and substitute therefor --an--; after the word "supported", delete "ed".

Claim 1, line 39, delete ", portion" and substitute therefor --portion,--.

Claim 9, line 34, delete "a" and substitute therefor --an--.

Claim 9, line 46, delete "pistons" and substitute therefor --piston--.

Claim 9, line 48, delete "portion" and substitute therefor --portions each--; line 49, delete ",each".

Claim 16, line 26, delete "forther" and substitute therefor --further--.

UNITED STATES PATENT AND TRADEMARK OFFICE
CERTIFICATE OF CORRECTION

PATENT NO. : 4,667,528
DATED : May 26, 1987
INVENTOR(S) : Paul P. Weyer

It is certified that error appears in the above-identified patent and that said Letters Patent is hereby corrected as shown below:

In the Claims:

Claim 17, line 33, delete "sleeves" and substitute therefor --sleeve--.

Claim 33, line 9, delete the second occurrence of the word "is".

Claim 37, line 47, after "heads", insert --portions--.

Claim 38, line 67, after "therebetween", insert --,--.

Signed and Sealed this

Nineteenth Day of July, 1988

Attest:

DONALD J. QUIGG

*Attesting Officer*    *Commissioner of Patents and Trademarks*